United States Patent Office 3,464,221
Patented Sept. 2, 1969

3,464,221
ABSORPTION REFRIGERATION SYSTEM
Hans Stierlin, Schlieren, Zurich, and Nikolaus Eber, Zurich, Switzerland, assignors to Kuhlapparate G.m.b.H., Schlieren, Zurich, Switzerland
Filed Mar. 30, 1967, Ser. No. 627,118
Claims priority, application Switzerland, Mar. 31, 1966, 4,704/66
Int. Cl. F25b 15/10
U.S. Cl. 62—476                                    1 Claim

ABSTRACT OF THE DISCLOSURE

An absorption refrigeration system employing evaporation of refrigerant fluid in the presence of an inert gas or pressure equalizing agent wherein the connection between the condenser and the main evaporator comprises a heat exchanger and an auxiliary evaporator downstream of the heat exchanger. The latter serves to permit exchange of heat between liquid refrigerant which flows from the condenser and a partial stream of gaseous third component which flows through the auxiliary evaporator countercurrent to and is warmed up in response to partial evaporation of liquid refrigerant.

BACKGROUND OF THE INVENTION

The present invention relates to an absorption refrigeration system. More particularly, the invention relates to improvements in so-called Platen-Munters uniform pressure absorption systems wherein a gaseous third component is necessary as pressure equalizing agent to enable condensation of the gaseous refrigerant. Such conventional absorption systems are disclosed, for example, in U.S. Patent No. 2,999,373 and one thereof is shown in FIG. 1 of the accompanying drawings. As a rule, the liquid absorbent used in such systems is water, refrigerant is ammonia, and the pressure equalizing agent is hydrogen gas. However, it is also known to utilize other refrigerants, solvents and pressure equalizing agents.

In order to achieve low temperatures in the evaporator of an absorption refrigeration system, it is customary to cool liquid refrigerant downstream of the condenser and prior to admission into the evaporator. Such cooling of liquid refrigerant can be carried out by exchange of heat with enriched cold gas which issues from the evaporator. However, presently known cooling arrangements and methods are not entirely satisfactory.

It is, therefore, an important object of the present invention to provide an absorption refrigeration system with a novel arrangement for cooling of liquid refrigerant between the condenser and the evaporator.

Another object of the invention is to provide an absorption system wherein liquid refrigerant is cooled by exchange of heat with the gaseous component and to construct the absorption system in such a way that the exchange of heat is carried out by full consideration and proper utilization of thermodynamic properties of the substances which circulate in the piping of the absorption system.

An additional object of the invention is to provide a novel method of cooling liquid refrigerant intermediate the condenser and evaporator of an absorption refrigeration system.

SUMMARY OF THE INVENTION

One feature of our invention resides in the provision of an absorption refrigerating system employing evaporation of refrigerant fluid in the presence of an inert gas or pressure equalizing agent which comprises a condenser having an inlet receiving vaporized refrigerant from a generator and an outlet for liquid refrigerant, a main evaporator for liquid refrigerant, a connection between the condenser and main evaporator including a conduit receiving liquid refrigerant from the outlet of the condenser and an auxiliary evaporator receiving refrigerant from the conduit, first pipe means for introducing into the auxiliary evaporator a gaseous third component so that such gaseous component flows countercurrent to and is warmed up in response to partial evaporation of liquid refrigerant, and second pipe means for receiving the thus warmed up gaseous component from the auxiliary evaporator. The second pipe means is arranged to exchange heat with the conduit and is preferably inclined downwardly in a direction away from the auxiliary evaporator so as to make with a horizontal plane an angle of at least two degrees whereby liquid matter entering the second pipe means from the auxiliary evaporator can leave the second pipe means by gravity flow. Internal convection of hydrogen in the conduit can be prevented or substantially reduced by reducing the cross-section for a given circumference of the tube which is filled out by gas over the liquid level.

The novel features which are considered as characteristic of the invention are set forth in particular in the appended claims. The improved absorption refrigeration system itself, however, both as to its construction and its mode of operation, together with additional features and advantages thereof, will be best understood upon perusal of the following detailed description of certain specific embodiments with reference to the accompanying drawings.

DESCRIPTION OF THE PREFERRED EMBODIMENTS

Figure 1:
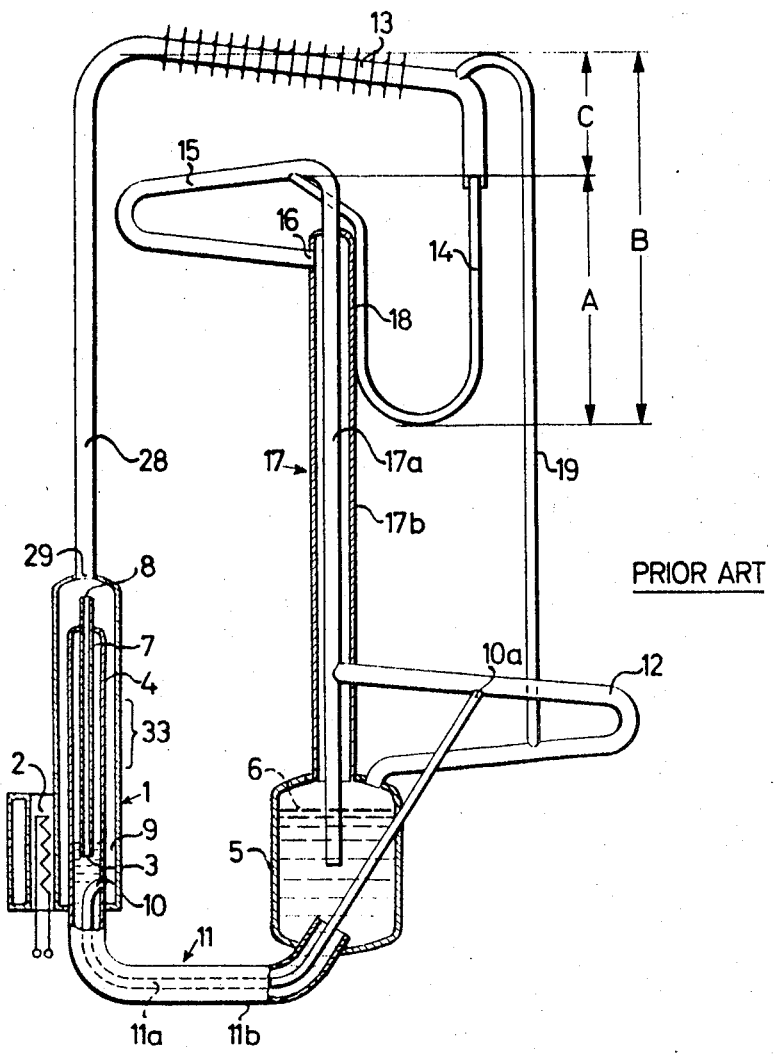
FIG. 1 is a diagrammatic view of a conventional three-fluid cycle absorption refrigeration system.

FIG. 1 illustrates a conventional absorption refrigeration system including a generator 1 having a lower portion 9 which is heated by a heating means here shown as an electric heating cartridge 2 connected to a suitable source of electrical energy. The generator 1 accommodates a thermosiphon pump including an upright tube 4. A liquid-collecting tank 5 contains a supply of the strong solution filling it to the level 6. The bottom portion of the tank 5 is connected with the lower portion 9 of the generator 1 by a first heat exchanger 11, the liquid heat exchanger. The afore-mentioned tube 4 accommodates an upright pumping pipe 7 whose upper and lower ends are respectively shown at 8 and 3. The lower portion 9 of the generator 1 constitutes a boiling chamber.

The heat exchanger 11 comprises an inner pipe 11a and an outer pipe 11b. That end portion of the inner pipe 11a which extends into the generator 1 is denoted by the numeral 10, and the other end portion 10a of the inner pipe 11a is connected with a tubular absorber 12. A riser pipe 28 connects the outlet 29 of the generator 1 with the inlet of a condenser 13. The outlet of the condenser 13 is in communication with an evaporator 15 through a conduit 14. The evaporator 15 has an outlet 16 which discharges into the outer pipe 17b of a second heat exchanger 17, the gas heat exchanger and this outer pipe 17b exchanges heat with a portion 18 of the conduit 14.

A pressure equalizing conduit 19 connects the condenser 13 with the inlet portion of the absorber 12. The operation of this conventional system is as follows: The cartridge 2 supplies heat energy to the generator 1. The strong solution of refrigerant (e.g., ammonia) in water or another absorbent is heated in chamber 9 to boiling temperature. Such solution fills the chamber 9 and the lower portion of the tube 4 to the level 6 because the outer pipe 11b of the first heat exchanger 11 allows strong solution to flow freely between the tank 5 and chamber 9. The solution boils at the lower end 3 of the tube 7 and the developing ammonia-water vapors entrain strong liquor upwardly through the tube 7. Such liquor is separated from ascending vapors at the upper end 8 of the tube 7 and flows back countercurrently through the annular passage between the envelope of the generator 1 and tubes 4 and 7. Rectification takes place in a rectifier 33 and the liquor which by now contains little refrigerant enters the left-hand end portion 10 of the inner pipe 11a to flow into the upper portion of the absorber 12. The liquor leaving the end portion 10a of the inner pipe 11a is saturated with refrigerant from the ascending gas stream in the absorber 12 and the thus saturated liquor flows back into the tank 5.

Vapors which are produced in the generator 1 with a desired degree of purity are liquefied in the condenser 13 and the resulting liquid ammonia flows through the conduit 14 to enter the evaporator 15. Evaporation of liquid ammonia in the evaporator 15 takes place in response to withdrawal of heat from the area around the evaporator, and the resulting vapors mix with ammonia-poor hydrogen rising from the absorber 12 and flowing upwardly through the inner pipe 17a of the second heat exchanger 17. The ammonia-enriched hydrogen gas leaves the evaporator 15 at 16 and flows downwardly through the outer pipe 17b of the heat exchanger 17. This heat exchanger 17 cools the rising stream of ammonia-poor hydrogen by exchange of heat with cold ammonia-rich hydrogen gas entering the heat exchanger 17 via outlet 16.

The purpose of the third heat exchanger which includes the portion 18 of the conduit 14 and the adjoining portion of the outer pipe 17b of the heat exchanger 17 is to enable liquid ammonia leaving the condenser 13 to participate in exchange of heat. This improves the efficiency of the cooling operation and lowers the temperature around the evaporator 15. The above will be readily understood by bearing in mind that the water value (specific heat of the flowing mass) of the enriched hydrogen gas stream exceeds considerably that of a gas stream containing little or no ammonia, and also that introduction of relatively hot liquid ammonia into the evaporator 15 would not allow to reach sufficiently low temperatures in the evaporator.

When considered from the thermodynamic point of view, it would be advisable to lead the conduit 14 along the full length of the second heat exchanger 17, i.e., to lengthen the portion 18 all the way to the absorber 12. Any other solution will render the thermodynamic process irreversible. However, such mounting of the conduit 14 is practically impossible, at least in most instances and without unduly increasing the cost, space and material requirements, because the distance B must exceed the distance A by a distance C which cannot be reduced below a certain minimum value. In other words, the ratio B:A must remain within a given range. This range must be maintained due to the fact that, at the start of the operation of the three-fluid cycle absorption system shown in FIG. 1, specific weight of pure ammonia is different from specific weight of the fluid which may fill the conduit 14. The specific weight of the fluid is higher and this fluid can be expelled from the U-shaped conduit 14 by ammonia if the hydrostatic head of ammonia exceeds the head of fluid. The same conditions prevail in normal operation (i.e., subsequent to start of the cooling operation) because the specific weight of the contents in one leg of the U-shaped conduit 14 is different from the specific weight of the contents in the other leg. This is due to the fact that the temperature of the fluid flowing through one of the legs is higher.

For reasons which are well known to persons skilled in the art of conventional three-fluid cycle absorption refrigeration systems, the point of entry of liquid ammonia into the evaporator 15 cannot be selected at will, i.e., it cannot be placed above a given level.

The above are serious drawbacks in certain applications of absorption refrigeration systems, for example, in deep freezers or the like. Thus, and if the area to be maintained under refrigeration cannot be cooled from above, the temperature in the area above the evaporator rises rapidly and the system will be effective only in response to lowering of the evaporation temperature or by resorting to more effective and hence more expensive insulation. This will insure that the temperature in each zone of the area to be cooled will remain below a predetermined value.

The pressure equalizing conduit 19 enables hydrogen gas to escape from the condenser 13 when the system is in operation. In the conventional system of FIG. 1, the conduit 19 conveys hydrogen gas from the condenser 13 into the absorber 12 or vice versa.

Figure 2:
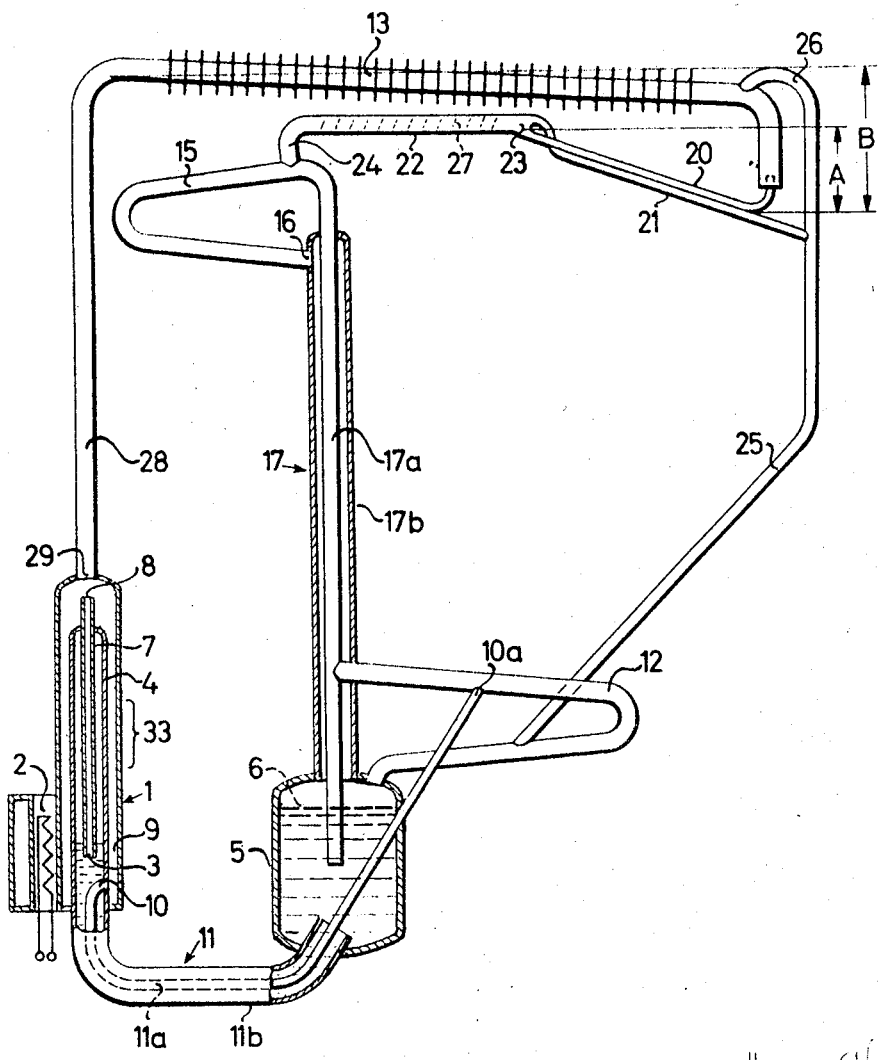
FIG. 2 is a similar diagrammatic view of an absorption refrigeration system which embodies one form of our invention.

The three-fluid cycle absorption refrigeration system of FIG. 2 is constructed in accordance with one embodiment of our invention. The outlet of the condenser 13 is connected with a conduit 20 which discharges liquid refrigerant into an auxiliary evaporator 22. In the auxiliary evaporator 22, liquid refrigerant flows countercurrent to a branched-off portion or partial stream of hydrogen gas which contains a small percentage of ammonia. Some ammonia evaporates into the hydrogen gas and is thereby cooled. It is easy to regulate the operation in such a way that the temperature of liquid ammonia which reaches the end 24 of the auxiliary evaporator 22 equals the temperature of hydrogen, i.e., ammonia is cooled to such lowermost temperature even before it enters the second or main evaporator 15. The branched-off stream of hydrogen gas is heated on its way through the auxiliary evaporator 22 and leaves at 23 to enter a return or bypass pipe 25 and to be reunited with the remainder of hydrogen gas at a lower level, preferably in the lower portion of the absorber 12. The return or by-pass pipe 25 has an elongated portion 21 which exchanges heat with the conduit 20 to insure that the stream of branched-off hydrogen gas effects some initial or preliminary cooling of liquid ammonia leaving the condenser 13.

A further conduit 26 serves as a pressure equalizing line. However, in contrast to the conduit 19 of FIG. 1, the conduit 26 is connected with the bypass conduit 25.

The auxiliary evaporator 22 is provided with suitable means (such as in internally mounted spiral 27 of wire) for insuring better wetting of the tube wall and so assuring a more efficient mass transfer.

Due to the provision of our auxiliary evaporator 22, the main evaporator 15 can extend to a higher level, i.e., closer to the condenser 13. Thus, the distance A in FIG. 2 must be just large enough to insure that any liquid ammonia which enters the portion 21 of pipe 25 will actually flow by gravity. The ratio of B to A will depend on factors which were pointed out in connection with FIG. 1.

The temperature at end 23 of the auxiliary evaporator 22 depends mainly from the quantity of hydrogen gas in the branched-off partial stream, i.e., such temperature depends indirectly from the flow resistance of the pipe 25. The important factor is the ratio of the resistances which the two partial streams of hydrogen gas encounter in their respective pipes. It is to be noted that, due to differences in temperature and degree of saturation with ammonia, the specific weights of the two partial streams are different and therefore, also the hydrostatic forces executed by them.

If the partial hydrogen gas stream flowing through the auxiliary evaporator 22 countercurrent to liquid refrigerant is relatively large because the pipe 25 offers little resistance to flow, it will be loaded up relatively low with refrigerant and the temperature at the upper end 23 of the auxiliary evaporator 22 will accordingly be low. This will cause losses due to irreversibility of the thermodynamic process, as a sudden drop in temperature of liquid refrigerant in the region of the end 23 occurs due to throttling of its partial pressure. If the saturation point (i.e., the temperature and partial pressure) of the refrigerant is lower in the region of the end 23, the throttling is more pronounced (irreversibility) and the efficiency is lower.

The throttling effect cannot be eliminated in its entirety (at least not in absorption systems which are of practical value) because the partial stream of hydrogen gas in the pipe 25 would have to be very small, i.e., the resistance offered by the pipe 25 to the flow of gas would be very high. In actual practice, this would mean that the pipe 25 would constitute a capillary; however, a capillary would be impractical because it does not permit for gravitational outflow of liquids. Thus, the operation of an absorption system using a capillary for the pipe 25 would be unsatisfactory because liquid could not drain by gravity flow. In other words, the cross-sectional area of the pipe 25 must exceed a certain minimum value. The designer will have more freedom of choice by using a pipe 25 of circular cross-sectional outline which is deformed along at least a portion of its length. The flow resistance of the deformed pipe is greater than that of a circular pipe of identical circumference length; on the other hand, the capillary action of the deformed pipe is less than the capillary action of a round pipe having the same resistance to flow. The temperature of liquid refrigerant at the end 24 of the auxiliary evaporator 22 will rise beyond the lowermost temperature if the rate of gas flow through the evaporator 22 is reduced beyond a certain minimum value.

For the just enumerated reasons, some losses due to throttling are unavoidable. However, such losses can be compensated, at least in part, by exchange of heat between the conduit 20 and portion 21 of the pipe 25. The exchange of heat between the conduit 20 and pipe portion 21 is particularly important in certain recent types of absorption systems wherein the heating means 2 is arranged to supply varying amounts of heat energy. In such systems, the throttling effect at the end 23 of the auxiliary evaporator 22 will change in automatic response to changes in the rate of heat energy supply by the heating means 2.

The conduit 20 and the auxiliary evaporator 22 together constitute a connection between the outlet of the condenser 13 and the inlet of the main evaporator 15. The inner pipe 17a of the heat exchanger 17 supplies gaseous component to the end 24 of the auxiliary evaporator 22, and such gaseous component flows countercurrent to and is warmed up in response to partial evaporation of liquid refrigerant.

Figure 3:
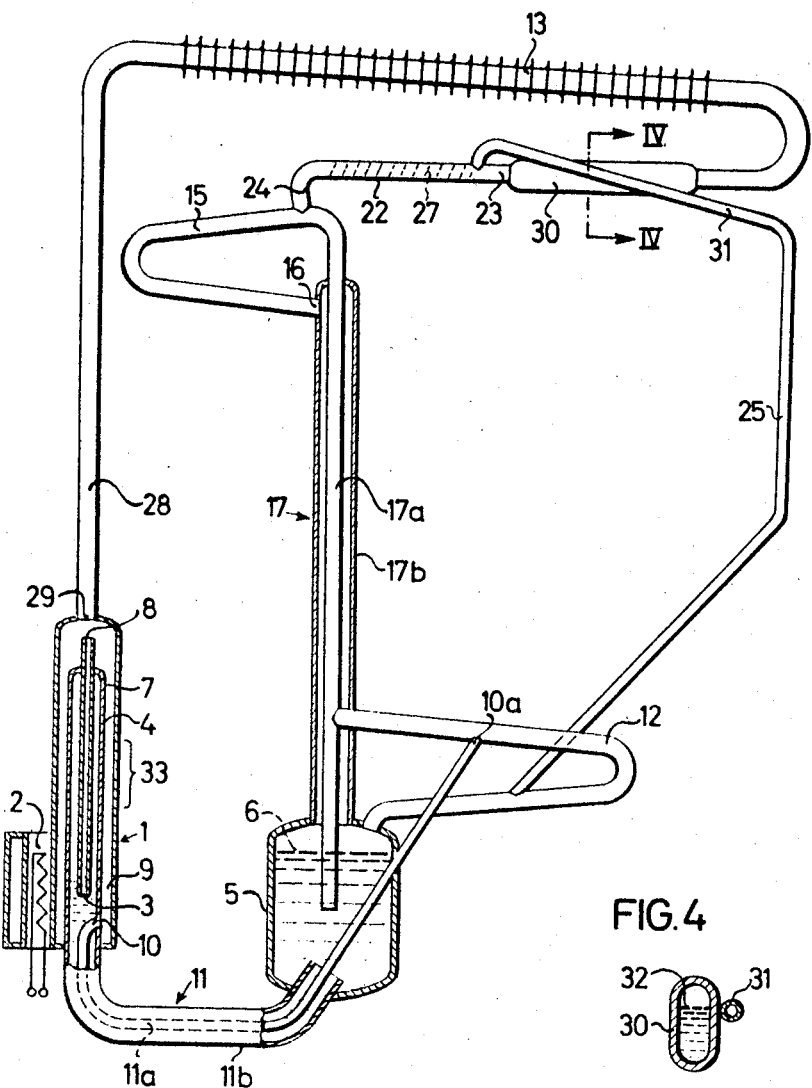
FIG. 3 is a diagrammatic view of an absorption refrigeration system which constitutes a modification of the system shown in FIG. 2.
Figure 4:
FIG. 4 is an enlarged sectional view as seen in the direction of arrows from the line IV—IV of FIG. 3.

FIG. 3 shows a simplified version of the just described three-fluid cycle absorption refrigeration system. The intake end 29 of the riser pipe 28 receives vapors from the generator 1 and the refrigerant is liquefied in the condenser 13. A conduit 30 connects the outlet of the condenser 13 with the auxiliary evaporator 22, and the latter has an end 24 which admits liquid refrigerant into the main evaporator 15. The pipe extending from the intake end 29 to the end 24 may consist of a single piece which is merely flattened in the region of the conduit 30 (see FIG. 4) and is provided with cooling ribs or fins in the region of the condenser 13. Thus, the aforedescribed parts 28, 13, 30, 22 form successive sections of a single pipe. Flattening of the section or conduit 30 is advisable to avoid undesirable circulation and evaporation of the third component over the free liquid level in conduit 30 (e.g., hydrogen gas). The section or evaporator 22 contains means 27 to insure good wetting.

The pressure equalizing pipe 26 of FIG. 2 has been omitted because the hydrogen gas can escape from the condenser 13 to flow via conduit 30 (above the surface 32) into the evaporators 22 and 15.

The flattened conduit 30 (FIG. 4) renders it possible to arrange the portion 31 of the return or bypass pipe 25 at an angle of at least 2 degrees with reference to a horizontal plane and to exchange heat with the conduit 30. Such inclination is necessary to insure that droplets can flow by gravity and that the pipe 25 is not clogged with liquid. The conduit 30 constitutes with the pipe portion 31 a heat exchanger and these parts can be connected to each other by welding, soldering, gluing or in another suitable way.

The conduit 30 may instead of being flattened be provided with suitable displacing means (not shown) to impede internal convection of gaseous component over the free-liquid level in said conduit.

Without further analysis, the foregoing will so fully reveal the gist of the present invention that others can, by applying current knowledge, readily adapt it for various applications without omitting features which fairly constitute essential characteristics of the generic and specific aspects of our contribution to the art, and, therefore, such adaptations should and are intended to be comprehended within the meaning and range of equivalence of the claim.

What is claimed as new and desired to be protected by Letters Patent is:

1. In an absorption refrigeration system with a pressure equalizing gas, a combination comprising a condenser having an outlet for a refrigerant; a main evaporator for liquid refrigerant; a connection between said condenser and said main evaporator including a conduit receiving refrigerant from said outlet and being configurated and outlined in such a way that it is only partly filled with liquid refrigerant forming a continuous free liquid level, displacing means provided in said conduit to impede internal convection of gaseous components above said freed liquid level, and an auxiliary evaporator receiving refrigerant from said conduit; first pipe means introducing into said main evaporator a first partial stream and into said auxiliary evaporator a second partial stream of said equalizing gas so that said second partial stream of said equalizing gas flows countercurrent to the liquid refrigerant in said auxiliary evaporator; and second pipe means for receiving the second partial gas stream from said auxiliary evaporator, said second pipe means being arranged to exchange heat with said conduit to thereby precool the refrigerant before it enters into said auxiliary evaporator, said second pipe means being inclined downwardly in a direction away from said auxiliary evaporator along the heat exchange path with the conduit to make with the horizontal plane an angle of at least two degrees, and at least a portion of said second pipe means being of other than circular cross-sectional outline.

References Cited

UNITED STATES PATENTS

| 2,167,663 | 8/1939 | Lyford | 62—110 |
| 2,167,697 | 8/1939 | Thomas | 62—493 |
| 2,484,669 | 10/1949 | Backstrom | 62—490 X |
| 2,715,819 | 8/1955 | Ashby et al. | 62—493 X |
| 2,964,921 | 12/1960 | Kirkorian | 62—493 X |
| 3,063,257 | 12/1962 | Phillips et al. | 62—490 X |
| 3,338,062 | 8/1967 | Kogel | 62—490 X |

LLOYD L. KING, Primary Examiner

U.S. Cl. X.R.

62—490, 493